United States Patent
Leutz et al.

(10) Patent No.: US 6,813,585 B2
(45) Date of Patent: Nov. 2, 2004

(54) METHOD AND DEVICE FOR MEASURING LENGTH, AREA OR VOLUME

(75) Inventors: Steffen Leutz, Sinsheim (DE); Juergen Luginsland, Leinfelden-Echterdingen (DE); Clemens Guenther, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 52 days.

(21) Appl. No.: 10/239,816

(22) PCT Filed: Dec. 8, 2001

(86) PCT No.: PCT/DE01/04635
§ 371 (c)(1),
(2), (4) Date: Sep. 25, 2002

(87) PCT Pub. No.: WO02/063238
PCT Pub. Date: Aug. 15, 2002

(65) Prior Publication Data
US 2003/0078755 A1 Apr. 24, 2003

(30) Foreign Application Priority Data
Feb. 3, 2001 (DE) .......................... 101 04 877

(51) Int. Cl.$^7$ ............................ G06F 15/00; G01C 3/08
(52) U.S. Cl. ...................... 702/158; 702/157; 702/159; 701/300; 701/201; 701/209; 340/995.13; 356/3.01
(58) Field of Search ................ 702/158, 151, 702/152, 157, 159; 356/4.01, 3.01, 3.03, 5.05; 701/219, 223, 300

(56) References Cited

U.S. PATENT DOCUMENTS

| | | | |
|---|---|---|---|
| 4,730,190 A | | 3/1988 | Win |
| 5,148,411 A | | 9/1992 | Shalvi |
| 5,150,310 A | * | 9/1992 | Greenspun et al. .......... 342/451 |
| 5,696,705 A | * | 12/1997 | Zykan .......................... 702/159 |
| 6,137,564 A | | 10/2000 | Schmidt et al. |
| 6,624,881 B2 | * | 9/2003 | Waibel et al. .............. 356/4.01 |
| 6,662,101 B2 | * | 12/2003 | Adachi ........................ 701/201 |
| 6,704,097 B2 | * | 3/2004 | Waibel et al. .............. 356/4.01 |

FOREIGN PATENT DOCUMENTS

| | | |
|---|---|---|
| DE | 196 48 626 A1 | 5/1998 |
| DE | 197 20 280 A | 11/1998 |
| DE | 198 36 812 A | 2/2000 |

OTHER PUBLICATIONS

Katalog "Gewerbliche Elektrowerkzeuge: Bosch Programm 2000/2001", Robert Bosch GMBH, PP 280–281.

* cited by examiner

*Primary Examiner*—Kamini Shah
(74) *Attorney, Agent, or Firm*—Michael J. Striker

(57) ABSTRACT

A device and a method for determining length, area, and/or volume using a distance measuring device 10 includes a transmit unit 18 and a receive unit 20 in one housing, a keypad 28 for operating the measuring device 10, and an integrated computer 22 for evaluating measured data, and a display panel 26 for displaying the measurement results. The display panel 26 of the measuring device 10—after the operator selects a desired measurement mode by pressing just one button 32 on the keypad 28—uses an icon-based graphic display to indicate which of the individual measurements required to determine the desired measurement variable has yet to be carried out.

11 Claims, 2 Drawing Sheets

METHOD AND DEVICE FOR MEASURING LENGTH, AREA OR VOLUME

This application is a 371 of PCT/DE01/04635, which claims the priority from foreign application DE 101 04 877.7 filed Feb. 3, 2001.

BACKGROUND OF THE INVENTION

The present invention concerns a method and a device for determining length, area, and volume using a distance measuring device.

A method and a device for measuring area and volume was made known in DE 198 48 628 A1, which said device is based on the fact that, from a central point in the space to be measured, all spacial and surface corner points to be detected are pointed at and acted upon by a laser beam. The 3D values of the corner points are determined by the reflected laser beam based on the distance and the associated angles, and a true-to-scale drawing is created. The device disclosed in DE 198 48 628 A1 includes a laser distance measuring device comprising a laser transmitter and a laser receiver that is attached to a stand via a tilting and rotating device for positioning and for measuring angles. The device disclosed in DE 198 48 628 A1 also includes a telescopic sight and an electronic evaluation unit for capturing and transmitting data on angles and distances, and a computer connected therewith.

The method disclosed in DE 198 48 628 A1 is extremely expensive and requires a relatively long preparation period on the part of the operator, since a reference coordinate system, among other things, must be determined in advance of every measurement. Moreover, an additional external computer is needed for the method presented that has a further negative impact on the costs and the user friendliness of this measuring system.

A laser distance measuring device ("DLE 30 Laser plus") is made known in the catalog entitled "Gewerbliche Elektrowerkzeuge: Bosch Programm 2000/2001" from Robert Bosch GmbH, D-70442, Stuttgart, Germany, with which said device length, area and volume can be measured. This device has a multi-line display panel in which, when a measurement mode is selected (for measuring either length, area, or volume), the type of measurement and the lengths to be measured are presented using icons.

Moreover, the "DLE 30 Laser plus" laser distance measuring device has a keypad, each button of which is associated with a measurement mode. By pressing one of these buttons, the measurement mode associated with this button is selected, and the desired measurement variable can be determined by starting the measuring procedure.

This device has the disadvantage that the measurement signal used is a laser beam that absolutely must not strike the eye of the operator or the eyes of anyone else present in the surroundings where the measurement takes place, because this can cause irreversible damage to the retina. This measuring device is also relatively large and heavy for a hand-held measuring device.

The invention is therefore based on the object of creating a method and a device for calculating length, area and volume that provides relatively accurate measured results and that the operator finds easy and intuitive to learn and that are safe to operate.

SUMMARY OF THE INVENTION

The method according to the invention and the device operating according to this method for measuring length, area, and volume have the advantage that the desired measurement mode can be selected and changed using just one button on the keypad.

As a result, the keypad on the measuring device is clearly arranged, which makes the device easy to understand and operate.

A measurement mode selected once via the unequivocal measurement mode button on the device is shown in a schematic, graphic presentation in the display panel and can therefore be easily monitored by the operator.

With the method according to the invention, the operator—after selecting the desired measurement mode—advantageously need only carry out individual length measurements that an integrated computer in the measuring device evaluates after the required measurements are completed and automatically determines the desired area or volume dimensions and presents them immediately in the display panel of the measuring device.

The display panel of the measuring device according to the invention displays the most recently measured value along with the length, area or volume dimension determined by the computer.

The ease of use and intuitive understandability of the measuring device are supported by the fact that, by means of the method according to the invention, the operator is instructed via the display panel as to which path measurements are still required in order to determine an area or volume dimension. The operator is requested via an icon-based, graphic presentation in the display panel of the measuring device to perform the length measurements required. This results in a nearly self-explaining measuring device. No training or studying of extensive operating manuals are required with the measuring device according to the invention.

An aspect that also contributes advantageously to the safe and simple use of the measuring device is the fact that the operator is informed via the display panel of the device if the measuring procedure is still underway. The completion of each individual measurement is indicated by means of an additional signal, such as an acoustic signal, for example.

In terms of the ease of use of the measuring device, it is also advantageous that the measurement direction can be indicated by means of an optical signal output with the actual measurement signal. If an ultrasonic distance measuring device is used, the reference point pointed at with the device can be checked.

An electronic memory integrated in the measuring device makes it possible to advantageously store measured values, to add different measured values, and to recall stored measured values and present them in the display panel of the measuring device.

The computer integrated in the measuring device, and its electronic memory can be advantageously operated via buttons on the operating panel of the measuring device.

BRIEF DESCRIPTION OF THE DRAWINGS

An exemplary embodiment of the invention is presented in the drawing and it is explained in greater detail in the subsequent description.

DETAILED DESCRIPTION OF THE PREFERRED EMBODIMENTS

Figure 1:
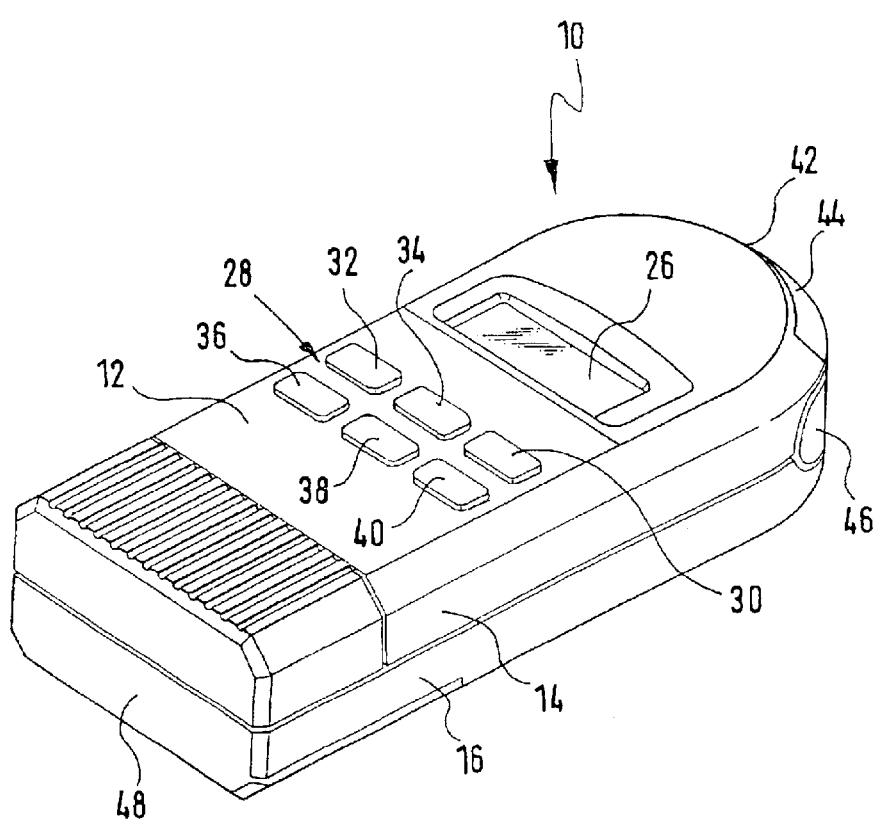
FIG. 1 shows a perspective illustration of a device, according to the invention, for determining length, area, and volume.

The handheld device according to the invention and shown in a perspective view in FIG. 1 for determining length, area, and volume—referred to hereinafter as the measuring device 10—has a housing 12 that, in the exemplary embodiment shown, is composed of a top half-shell 14 and a bottom half-shell 16. Integrated in the housing 12 and therefore not visible in FIG. 1 are a transmit unit 18 and a receive unit 20 for the measurement signal, as well as an internal computer 22 with associated memory 24.

The housing 12 has a display panel 26 and a keypad 28. In the present exemplary embodiment of the measuring device 10 according to the invention, the keypad 28 has a button 30 for turning the measuring device on and off, a button 32 for selecting the measurement mode, and a measurement button 34 for starting each measurement procedure. Moreover, in the present exemplary embodiment, the keypad 28 has a button 36 for recalling the contents of a memory 24 of the computer 22 located inside the measuring device, and a button 38 for automatically adding the most recent measured value to the existing contents of the memory 24. The current measured value shown in the display panel 26 can be cleared by pressing a button 40 on the keypad 28 one time. Pressing the button 40 twice clears the contents of the memory 24 of the internal computer 22.

Located on the front side 42 of the housing 12 is an opening 44 for the measurement signal to leave the housing 12 and for the reflected signal to enter the housing 12. In the exemplary embodiment presented here, the measured signal used is ultrasound. In principle, however, the invention is not limited to the use of ultrasound as a measurement signal. Waves of other frequencies can also be used for measuring distance.

Located on the front side 42 of the measuring device 12 is a second opening 46, out of which an optical signal that is parallel to the measurement signal can exit. Using this optical signal, it is possible to accurately determine the reference point aimed at when performing a measurement.

The back side 48 of the housing 12 of the measuring device 10 according to the invention functions as a reference plane for determining length.

Figure 2:
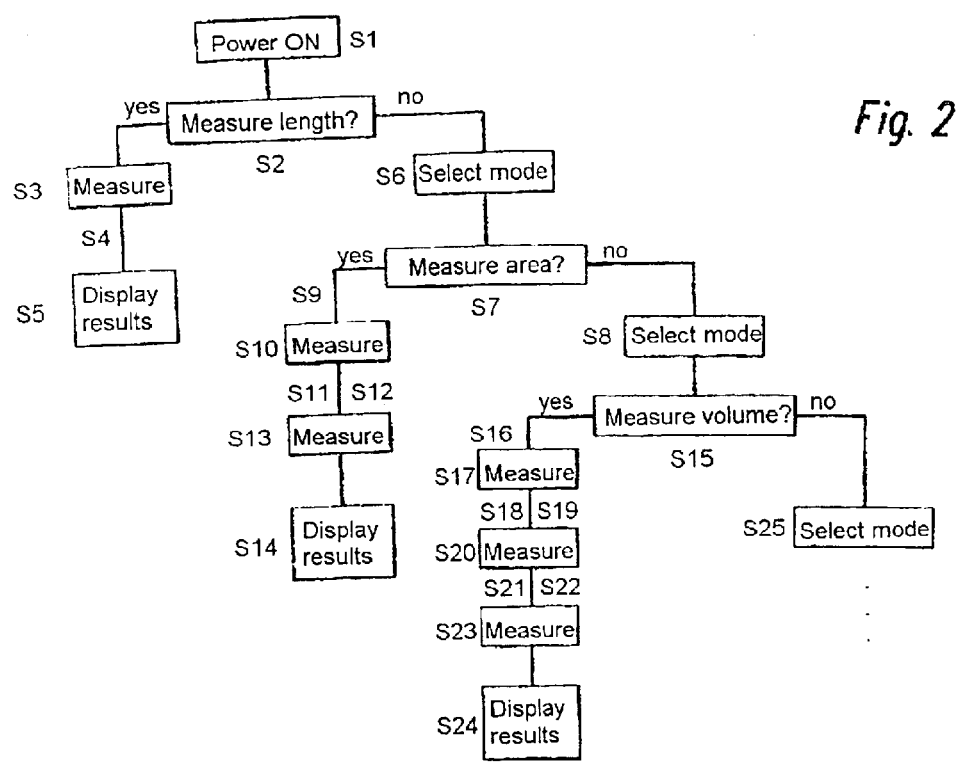
FIG. 2 shows a simplified flow diagram of the method, according to the invention, for determining length, area, and volume.

The flow diagram shown in FIG. 2 describes the sequence and application of a plurality of measurement functions that are possible with the device according to the invention. The device has various measurement functions that can be selected by repeatedly pressing the measurement mode button. The sequence that occurs when the measurement mode button is pressed is as follows: measure length, measure area, measure volume.

The method according to the invention for determining length, area and volume will be described hereinbelow with reference to the individual procedural steps (S) of an exemplary embodiment.

After the device is turned on (S1) using the ON/OFF button 30, the measuring device 10 automatically enters the "measure length" mode. A blinking line appears in the display panel 26 as a request to the operator to perform a length measurement. The operator must now decide (S2) if he wants to measure length or perform another measurement function.

If the operator wants to measure length, he can start the length measurement directly by pressing measurement button 34 on the keypad 28 (S3). Before doing so, the operator must position the measuring device 10, i.e., he must place the back side 48 on a point at which the measurement is to begin. The operator positions the measuring device 10 toward the target area at a right angle, then presses measurement button 34 to start the measurement procedure.

During the measurement procedure, a line icon extending from right to left in the display panel 26 indicates to the operator that a measurement is being carried out (S4). An additional acoustic signal sounds to indicate that each individual measurement has been completed, and the actual measured value for the length measurement appears immediately in the lower right-hand corner of the display panel 26 of the measuring device 10 (S5).

If the length of a path cannot be determined internally in the device, the acoustic signal does not sound, and a display appears in the display panel 26 to indicate that the measurement was unsuccessful. The measuring device is then ready to perform further measurements.

If the operator does not want to measure length, but he does want to measure area or volume, he must press mode button 32 (S6) after the measuring device is turned on (S1). After the mode button 32 is pressed once (S6), a square icon appears in the lower left-hand corner of the display panel 26 of the device 10 that indicates that the measuring device 10 is now in the "measure area" mode. The operator must now decide (S7) if he wants to measure area or volume.

If the operator wants to measure volume, he presses mode button 32 one more time (S8). A cube icon appears in the display panel 26 of the measuring device 10 to inform the operator that the device is now in the "measure volume" mode.

If the operator wants to measure area, the measuring device 10 is ready to measure area after step S6 is performed.

If the measuring device 10 has already been turned on and is not in the "measure area" mode, the operator must press mode button 32 repeatedly until the square icon appears in the lower left-hand corner of the display panel 26.

A first side of the square icon blinks in the display panel 26 of the measuring device 10 (S9) as a request to the operator of the measuring device 10 to perform a first length measurement in order to determine the desired area.

The operator presses measurement button 34 (S10) to start the measurement procedure. Again, an acoustic signal is emitted by the device to indicate that the procedure has been completed.

The length value determined for the first side of the desired area appears in the display panel 26 of the measuring device 10. The corresponding side of the square icon stops blinking in the display 26 (S11).

A second side of the square blinks in the display 26 of the measuring device 10 (S12) as a request to the operator to perform a second length measurement that is orthogonal to the first measurement in order to determine the desired area.

When measurement button 34 is pressed again (S13), the second path length required to calculate area is obtained. The most recently determined path length and the surface area determined by the internal computer 22 in the measuring device 10 based on the two previous length measurements is displayed in the display panel 26 of the measuring device 10 (S14).

If the measuring device 10 is in the "measure volume" mode (S8), this is indicated by means of a cube icon in the lower left-hand corner of the display panel 26. If the device 10 has already been turned on and is not in the "measure volume" mode, the operator must press mode button 32 repeatedly until the cube icon appears in the lower left-hand corner of the display panel 26 of the measuring device 10.

A first side of the cube icon blinks as a request to the operator to measure the length of a first path of the desired volume (S16).

The operator presses measurement button 34 (S17) to determine this first length and display it in the display panel 26 of the measuring device 10. The first side that was blinking previously stops blinking (S18).

A second side of the cube now starts blinking as a request to the operator to measure a second orthogonal path to determine volume (S19). The operator presses measurement button 34 (S20) to determine this second path length.

When the measurement procedure is over, the display 26 of the measuring device 10 displays the most recently measured path length together with a surface area determined based on the last two path measurements. The second line of the cube icon that blinks in the display panel 26 of the measuring device 10 during the measurement now stops blinking (S21).

A third line now blinks in the display panel 26 of the measuring device 10 as a request to the operator to measure a third line that is orthogonal to the two previously measured lines in order to determine the desired volume (S22).

The operator presses measurement button 34 (S23) to determine the third required path length. This third path length is presented along with the volume calculated by the internal computer 22 of the measuring device 10 based on the three most recent length measurements in the display panel 26 of the measuring device 10 (S24).

In the case of the method according to the invention, the measurement mode can be changed by repeatedly pressing the measurement mode button 32 (S25). The currently selected measurement mode is indicated in each case by means of the corresponding icon for a line (for length measurements), a square (for area measurements) or a cube (for volume measurements) in the lower right-hand corner of the display panel 26 of the measuring device 10.

Reference Numerals

10 Measuring device
11
12 Housing
13
14 Upper half-shell
15
16 Lower half-shell
17
18 Transmit unit
19
20 Receive unit
21
22 Internal computer
23
24 Computer memory
25
26 Display panel
27
28 Keypad
29
30 ON/OFF button
31
32 Measurement mode selection button
33
34 Measurement button
35
36 Memory recall button
37
38 Memory input button
39
40 "Clear" button
41
42 Front side of the housing
43
44 Opening
45
46 Opening
47
48 Back side
49
S1 Power On
S2 Measure length?: Yes or No
S3 Start measurement
S4 Actively measuring
S5 Results display: length measurement
S6 Press measurement mode selection button
S7 Determine area?: Yes or No
S8 Press measurement mode selection button
S9 Request first measurement for determining area
S10 First measurement for determining area
S11 Display the first length value for determining area
S12 Request second measurement for determining area
S13 Second measurement for determining area
S14 Display the second length value and the area dimensions
S15 Measure volume? Yes or No
S16 Request first length measurement for determining volume
S17 First length measurement for determining volume
S18 Display the first length measurement for determining volume
S19 Request the second measurement for determining volume
S20 Second length measurement for determining volume
S21 Display the second length value and the area dimensions
S22 Request the third length measurement for determining volume
S23 Third length measurement for determining volume
S24 Display the third length value and the volume dimensions
S25 Press the measurement mode selection button

What is claimed is:

1. A method for determining length, area, and/or volume using a distance measuring device (10) having a transmit unit (18) and a receive unit (20) In one housing (12), a keypad (28) for operating the measuring device (10), an integrated computer (22) for evaluating measured data, and a display panel (26) that—after the operator (S2, SO, S8) selects a desired measurement mode—uses an icon-based graphic display to indicate which individual measurements are still required in order to determine the desired measurement variable, wherein the operator can switch between the available measurement modes of length measurement, and area and/or volume determination by pressing a single button (32) on the keypad (28) of the measuring device (10).

2. The method according to claim 1, wherein the measurement mode selected by means of the button (32) is confirmed by means of an icon-based, graphic presentation in the display panel (26) of the measuring device (10).

3. The method according to claim 1, wherein the measurement variable corresponding to the measurement mode selected is determined by means of the computer (22)

integrated in the measuring device (10) based on individual distance measurements to be performed by the operator and, after the measurement is completed, said measurements variable is automatically displayed in the display panel (26) of the measuring device (10).

4. The method according to claim 3, wherein an additional distance measurement required to determine a measurement variable corresponding to the selected measurement mode is requested of the operator by means of a blinking line in the graphic presentation symbolizing the selected measurement mode in the display panel (26) of the measuring device (10).

5. The method according to claim 4, wherein, for the duration of each distance measurement, the display panel (26) of the measuring device (10) indicates that the measuring device (10) is active.

6. The method according to claim 5, wherein the end of every successful distance measurement is indicated by means of an acoustic signal.

7. The method according to claim 6, wherein, after each distance measurement is completed, the result of the most recent distance measurement is presented in the display panel (26) of the measuring device (10) along with the measurement variable determined by the computer (22) and corresponding to the selected measurement mode.

8. The method according to claim 1, wherein the measuring direction of the measuring device is indicated by means of an optical signal emitted with the measurement signal.

9. A measuring device for determining distance, area, and/or volume having a transmit unit (18) and a receive unit (20) in one housing (12), a keypad (28) for operating the measuring device (10), an integrated computer (22) for the direct evaluation of measured data, and a display panel (26) for presenting the measured results, wherein the keypad (28) has only one button (32) for selecting the various measurement modes, and wherein the display panel (26) of the measuring device (10) uses an icon-based graphic presentation to actively indicate which measured values are still required by the internal computer (22) In order to determine the measurement variable corresponding to the measurement mode selected.

10. The measuring device according to claim 9, wherein the internal computer (22) of the measuring device (10) has an electronic memory (24) for storing measured values, for adding measured values, and for recalling measured values, the contents of which can be presented in the display panel (26) of the measuring device (10).

11. The measuring device according to claim 10, wherein the internal computer (22) of the measuring device (10) can be operated via buttons (36, 38, 40) of the keypad (28) of the measuring device (10).

* * * * *